Jan. 26, 1943. P. KOLLSMAN 2,309,400
VERTICAL SPEED INDICATOR
Filed Jan. 14, 1938 6 Sheets—Sheet 6
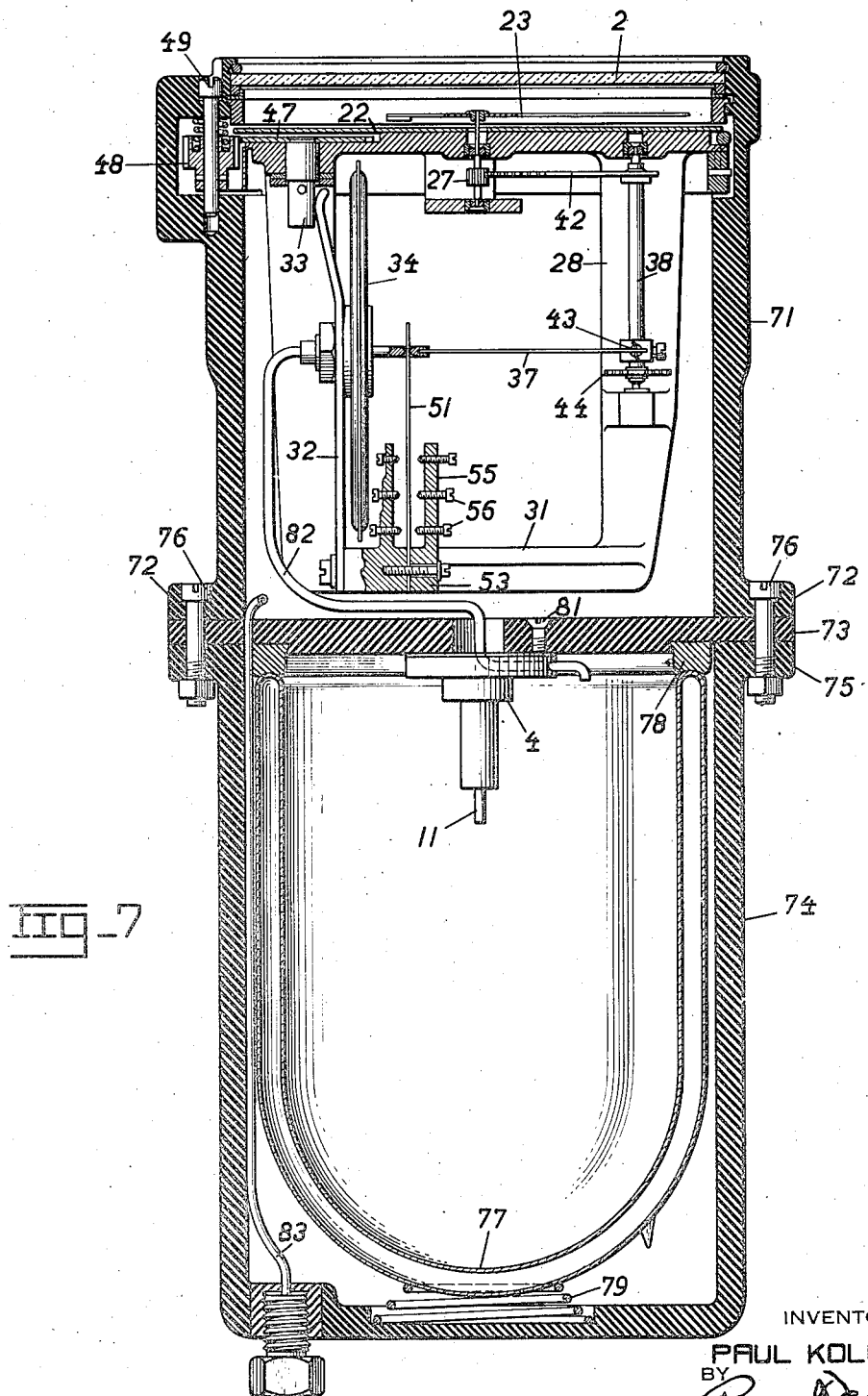
Fig_7
INVENTOR
PAUL KOLLSMAN
BY
ATTORNEY Patented Jan. 26, 1943

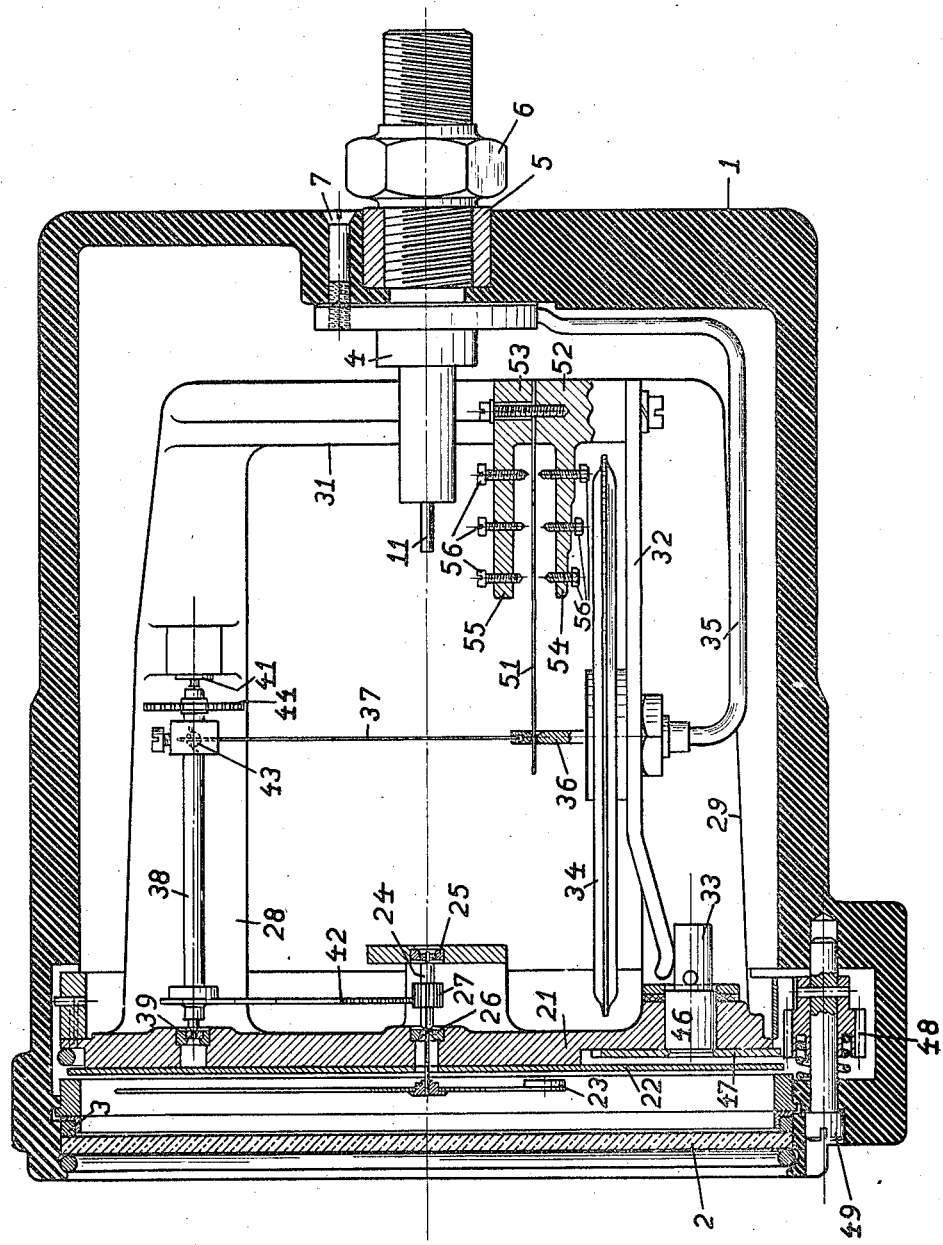

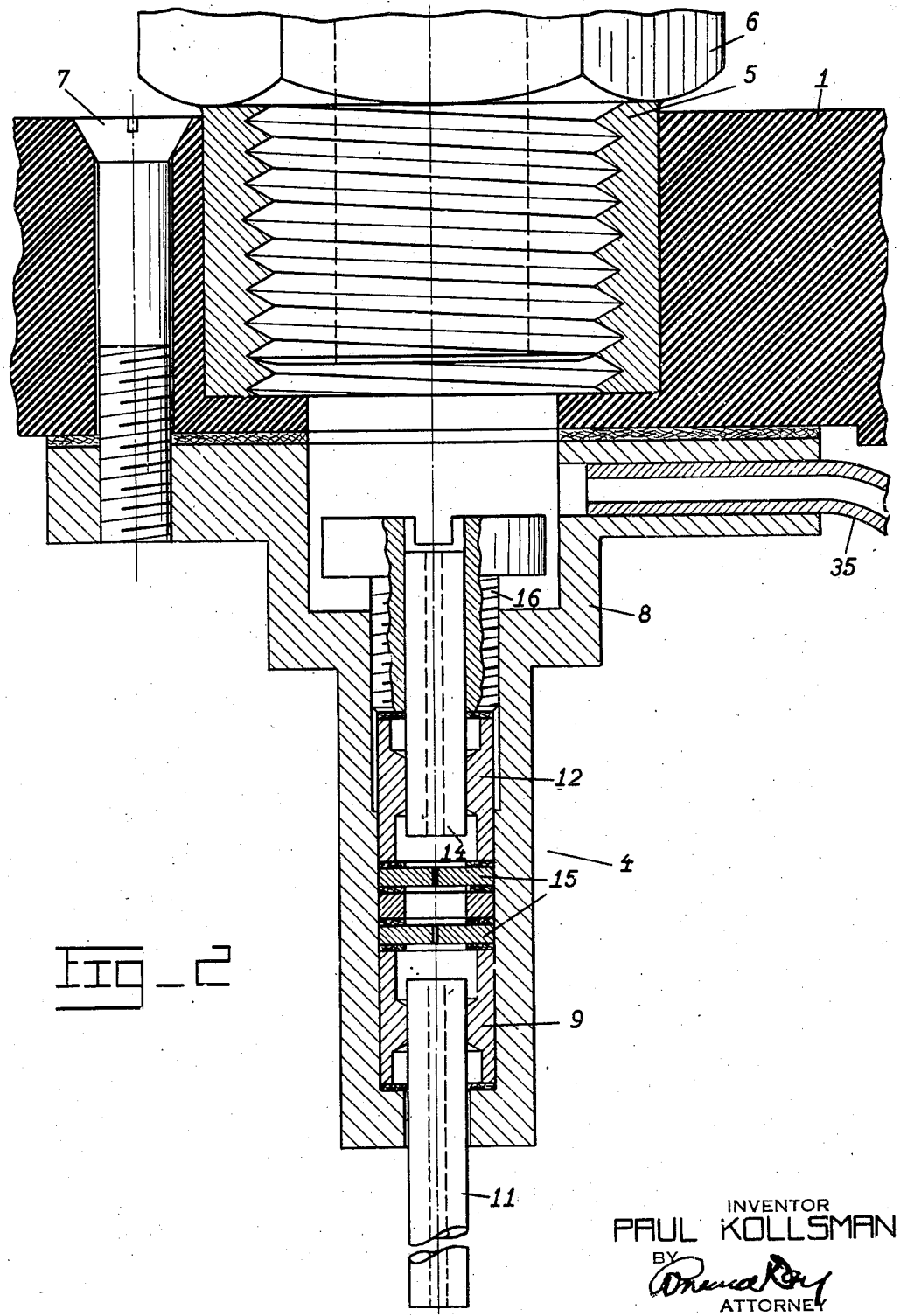

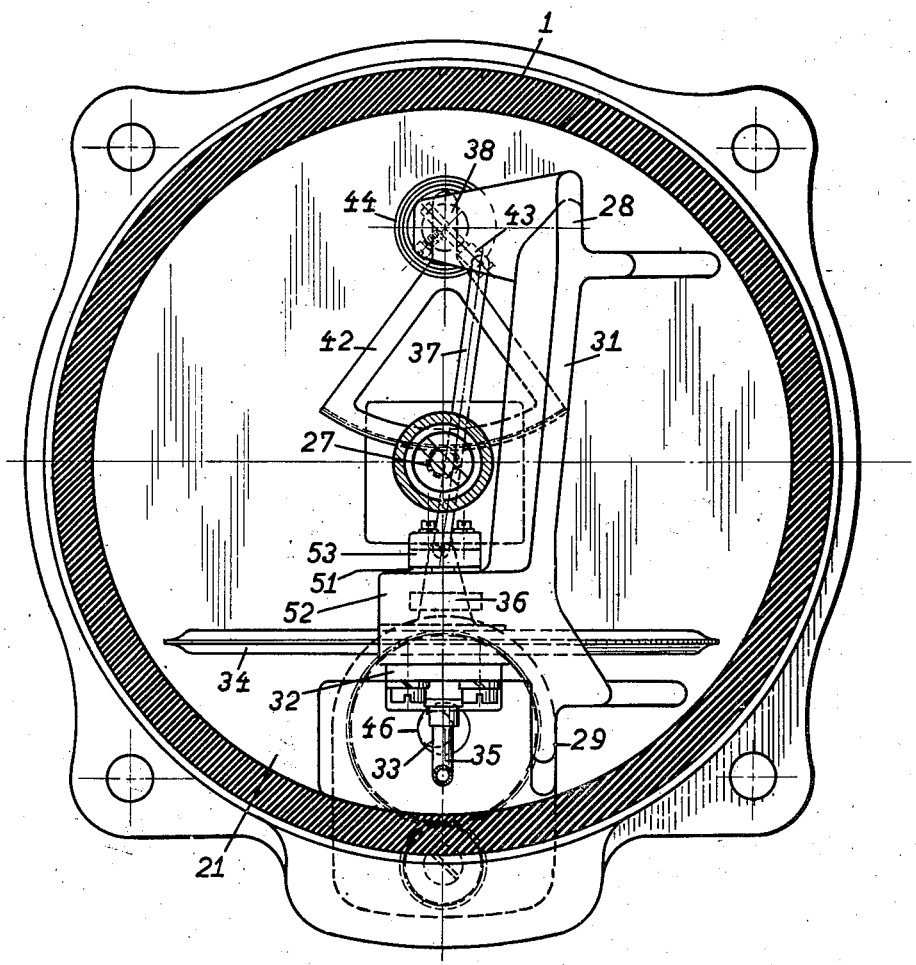
Fig_3

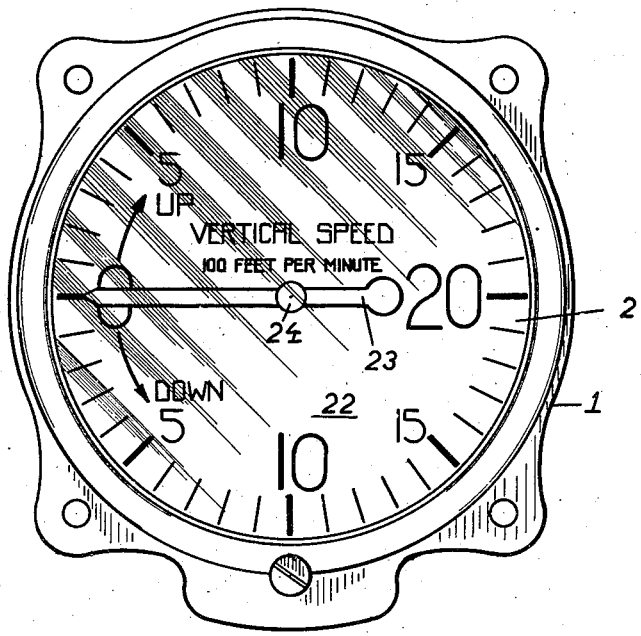
Fig_4
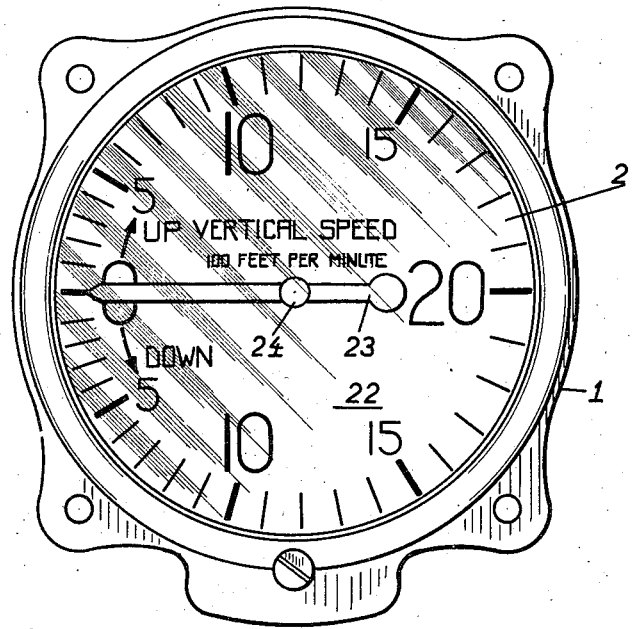
Fig_6

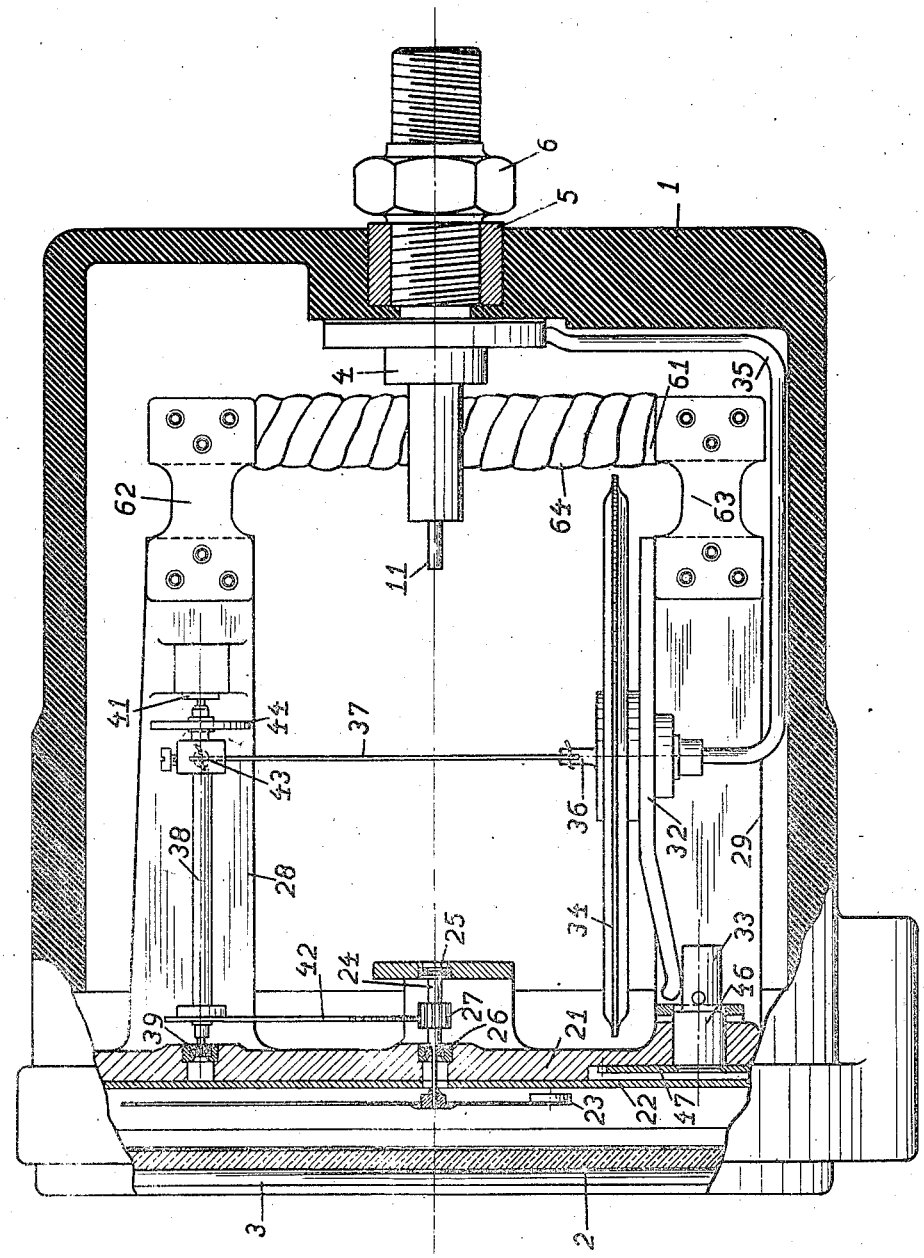

2,309,400

UNITED STATES PATENT OFFICE 2,309,400

VERTICAL SPEED INDICATOR

Paul Kollsman, Stamford, Conn., assignor, by mesne assignments, to Square D Company, Detroit, Mich., a corporation of Michigan Application January 14, 1938, Serial No. 185,071

11 Claims. (Cl. 73—179)

This invention relates to instruments for measuring the rate of speed at which an aircraft is changing its altitude; or to vertical air speed indicators; and it relates particularly to means for improving the accuracy of reading of such indicators; to means for correcting the reading of such instruments to obviate the occurrence of errors from changes in the temperature and altitude-pressure of the surrounding air; and to means for reducing the complexity and number of parts in such instruments.

Instruments of various patterns have been proposed for the measurement of the rate of speed of movement in a vertical direction, upward or downward, of an aircraft; that is, for measuring the vertical air speed. Most of these prior instruments have utilized for their basic operating mechanisms the combination of an indicator for showing differential pressure, a storage reservoir or chamber, and a restricted opening to the reservoir; the differential pressure between the reservoir and the surrounding air being measured to show the rate of change of altitude thereof. This difference of pressure is produced by the interaction of air in the chamber, and in the restricted opening thereto, with the change in ambient air pressure caused by the change in barometric pressure of air as the instrument moves upward or downward. Thus the indication of the meter is a function of the relationship between the rate of flow of air through the restricted opening and the rate of change of exterior air pressure which produces the air flow, between the chamber and the ambient atmosphere, through the restricted opening.

Previous instruments have utilized, for the restricted opening to the chamber, a relatively long, slender capillary tube, because of the fact that such a tube imposes a convenient restriction on the air flow and is relatively easy of adjustment for calibrating the instrument, by such expedients as varying the length of the capillary tube.

It is found that the viscosity of the air flowing through the capillary is the major factor in the restrictive effect. The effective indication produced by the viscosity of the air changes both with change in temperature, and with change in altitude-pressure and density, and accordingly, when an instrument has been calibrated at a given temperature and altitude-pressure, the readings of the instrument, while correct at the calibration temperature and altitude-pressure, are seriously in error at other temperatures and altitude-pressures because of the changes in the viscosity of the air and in the varying altitude-pressure relation. These errors are of such magnitude that an instrument calibrated for vertical air speed at sea level and summer temperature may yield readings which are in error by from 35% to 50% at the temperature and altitude-pressure prevailing at altitudes of from 20,000 to 30,000 feet.

By observation of instruments having these errors it is found that with an instrument incorporating the capillary tube type of restrictive opening calibrated at room temperature and sea level pressure of say, 75 degrees F. and 760 millimeters pressure, if, while maintaining the temperature at 75 degrees F., the ambient pressure is reduced to the value corresponding to the altitude-pressure at 30,000 feet, which is less than half of the sea level pressure, the instrument reading will be greater than the correct value by an error which may amount to a considerable percentage. Again if in the instrument, so calibrated at sea level altitude-pressure and 75 degrees F., the temperature is reduced, say, to freezing, or to zero F., while maintaining sea level altitude-pressure, the device also will show a reading which is below the true value by a considerable percentage. (At intermediate values of reduced temperature and reduced altitude-pressure, intermediate values of errors, and departures from correct reading values occur.)

As an alternative, a true pin hole for the restrictive opening may be utilized, with knife-sharp edges to the pin hole. The restrictive effect upon the flow of air through such a pin hole is largely due to turbulent flow in the neighborhood of the pin hole, as contrasted to the long capillary in which the restrictive effect is largely due to the viscosity of the air and the viscous flow effect within the capillary. Upon test of an instrument having a knife-edged pin hole as the restrictive opening, it is found that an instrument calibrated at sea level altitude-pressure and summer temperature of 75 degrees will, when measuring at the reduced pressures corresponding to high altitudes, give a reading which is below the true value. Similarly, such an instrument calibrated at sea level altitude-pressures and room temperatures gives a high reading at reduced temperatures.

The present invention is based upon the discovery that these respective errors not only are opposite in sign, but are of the same order of magnitude. Thus, in this invention the temperature viscosity error of the capillary is caused to neutralize the temperature-density error of the pin hole, and the altitude-pressure error of the capillary is caused to neutralize the altitude-pressure error of the pin hole. Both types of neutralization occur with change in temperature and change in pressure of the air actuating the instrument. This neutralization is sufficiently good to throw the residual errors into a wholly different order of magnitude, but the neutralization may result in a graduation of the instrument dial which is not wholly linear over the entire useful range of the instrument.

This is due to the fact that the flow of air through a capillary tube varies directly as the pressure differential between the opposite ends of the capillary tube, whereas the rate of flow of air through a pin hole opening varies according to the square of the pressure between opposite sides of the pin hole. That is, to drive twice as much air through the capillary requires twice the pressure; whereas to drive twice the amount of air through a pin hole requires four times the pressure. And similarly, the errors of the respective instruments vary with change in temperature and pressure according to different mathematical powers. It has not to the present, however, been determined whether these powers according to which the errors vary are the first or second or other mathematical powers, nor does it affirmatively appear that these variations are simple whole number powers.

The present invention utilizes a combination of capillary restrictive opening and pin hole restrictive opening for the restrictive means to the chamber member for the purpose of obtaining compensation of the respective errors of the two types of opening, thereby securing a greatly increased accuracy of reading of the instrument such as to bring the errors into a different order of magnitude. By this construction the respective errors of the two types of restrictive opening produce a restrictive effect which is relatively very little influenced by changes in viscosity or by changes in altitude-pressure or density, and accordingly, an instrument incorporating a restricted opening taking the form of a combined pin hole and capillary structure may be calibrated at sea level and summer temperature and thereafter holds its calibration with only minor and negligible errors at high altitudes, low pressures and low temperatures (or vice versa).

A convenient type of combination restrictive opening may be made in the form of a small hole through a sheet of metal, either one or several such openings being utilized. A chamber volume of approximately fifty cubic inches may conveniently be associated with a restrictive opening taking the form of two perforations, arranged in series, each having a diameter of nine and one-half thousandths of an inch (0.0095") and a length of forty-five thousandths of an inch (0.045") together with one or more capillary tube members which may have a bore diameter of from ten to twenty-five thousandths of an inch and a length of approximately one-half inch. In this type of construction the respective ends of the smaller short openings in the metal plates serve as the pin hole openings, and the tubular portion between the respective ends serves as a capillary tube type of restrictive opening. It is obvious that for purposes of calibration changes in the dimensions of the pin hole portion of the restrictive opening member are relatively difficult to make, especially in view of the fact that sharp edges at the respective ends of the perforations are desirable. Accordingly, the final calibration of the instrument may be obtained by varying the length of the auxiliary larger capillary tube portion.

As above pointed out, the rate of flow of air through a capillary tube varies as the first power of the applied pressure, and through a pin hole opening varies as the square of the applied pressure. Accordingly, an instrument having a capillary tube type of restrictive opening utilizes a linear type of scale, whereas an instrument having purely a pin hole type of restrictive opening utilizes a square law type of scale, and an instrument using a combination of the two requires a scale which is a composite or compromise between the scales characteristic of instruments using solely the respective single types of restrictive openings.

In some instances such a compromise scale is satisfactory; in other instances it is desirable that it be modified to become a true first power or linear scale, and for this purpose an adjustable compensating spring may be utilized.

Previous instruments have also been grossly inaccurate because of the influence produced upon the instrument readings by such temperature phenomena as flow of heat to or from the air storage chamber or reservoir. This flow causes a thermal pressure change within the reservoir which is interpreted erroneously by the pressure sensitive member, and indicated as a vertical speed movement.

This error in the reading is a function of the relationship between the flow of heat to or from the reservoir and the flow of air through the restricted passage due to thermal pressures, and under extreme conditions may amount to half or more of the full scale reading of the instrument. This is a zero-shift of the instrument which must be corrected. Prior instruments have corrected a substantial portion of this zero-shift by the expedient of applying a very thorough heat insulation to the reservoir, to prevent heat transfer, and prior instruments have thereby succeeded in reducing this zero-shift to an amount commensurate with other errors of the instrument.

It is found that the usual Bakelite case suitable for airplane instruments provides a substantial amount of heat insulation, and accordingly a further portion of the invention consists in the utilization of a Bakelite case both as the air chamber, and as a container for the indicating mechanism.

For some purposes the insulation provided by the case alone is sufficient. But for other requirements a more thorough heat insulation is necessary. This may be provided by the application of an insulating jacket to the exterior of the case, the jacket being of such character as a cotton or asbestos tape wrapping or other fibrous or cellular heat insulating material. Alternatively, the improved heat insulating characteristics may be obtained by the provision of an insulating member inside of the case which may take the form of fibrous or cellular insulating material, or may take the form of a vacuum jacket member of the thermos bottle type which may be formed of glass or steel and evacuated to the appropriate extent. In this embodiment the vacuum jacket may be inserted within the case and may have the actuating mechanism positioned within the vacuum jacket member. The case as a whole may, in this embodiment, be utilized as the reservoir or preferably the open end of the vacuum jacket member may be stoppered by a cork or other appropriate insulating stopper to cause the vacuum jacket member to serve by itself as the chamber or reservoir for the production of the pressure differential which actuates the indicating mechanism. Thus, this embodiment provides a structure in which both the case and the vacuum jacket member together serve as the restrictively controlled chamber, and as a container for the indicating mechanism.

It is also found that any residual zero-shift due to the flow of heat through the heat insulating case may be compensated for by the use of a heat insulated member as a portion of the frame of the indicating mechanism, the heat insulated member being positioned to adjust the pointer zero-position by an amount sufficient to compensate for the zero-shift incident to the flow of heat through the case. It is to be observed that the heat leakage between the heat insulated member and the surrounding air within the case desirably should correspond in rate to the rate of heat leakage through the case, and to the rate of flow of air through the restricted opening. Thus, a temperature equilibrium is approached by the heat insulated member at approximately the same rate of speed that the heat equilibrium is approached by the air and mechanism within the case, and also the same rate at which the chamber pressure approaches equilibrium. In this way a very accurate maintenance of zero position is obtainable with a minimum of apparatus and construction.

For some purposes, it is desirable that the air chamber or reservoir shall have a more efficient heat insulation than is provided by the above described embodiment and it is in any event desirable that the restrictive opening to the air chamber shall have at all times the same temperature as the temperature of the air within the chamber. The device of the present invention is particularly adapted to the incorporation within a single instrument assemblage of the pressure sensitive member, the pointer and dial, the actuating mechanism, and a separate, efficient, heat insulated air chamber with the restrictive opening positioned within the insulated chamber. For this purpose the instrument may be constructed with the aneroid capsule and the various associated indicating members at the front of the case wtih the heat insulated chamber in the form of a vacuum jacket member of the thermos bottle type at the rear of the case, and the restrictive opening of the type previously described attached to a closure for the thermos bottle type of chamber. The connection to the capsule is then conveniently passed through the closure and connected to the interior of the insulated chamber. A thermos bottle type of chamber is found to provide highly efficient heat insulation and it may conveniently take the form of an open top bottle closed with a stopper which may be of more or less efficient heat insulating character, or the bottle may have a restricted neck and a cork stopper of maximum heat insulating properties. The choice is determined by the rate of temperature change which is apt to be met by the instrument and the tolerance limits which are applied to the zero reading deviations of the instrument.

Thus, the device of the present invention utilizes a combination of a pin hole type of restricted opening and a capillary tube type of restrictive opening, together with a chamber or reservoir, a pressure differential responsive means, and an indicator, and may utilize a plurality of separate restrictive members of different characteristics, or different dimensions, such that the combination has a low-error characteristic, and is readily calibrated; and may further utilize a correcting mechanism for modifying the scale reading in such a way as to provide a uniform scale over the entire length of pointer travel. These new and useful features thus permit of an accurate calibration of a vertical speed indicator and the reduction in errors of reading to a lower amount than has previously been possible; and permit the meter so constructed to have a linear type of scale of high accuracy of reading, over a wide range of temperatures and altitude-pressures.

The invention further includes new and useful means for the correction of zero-shift which otherwise tends to be produced by heat leakage into the chamber or reservoir, utilizing for this purpose a heat insulated member cooperating with the pressure responsive member.

Accordingly, an object of the invention is to maintain accuracy of reading of a vertical air speed indicator over a wide range of temperatures and pressures.

Another object is to operate a vertical air speed indicator by the restriction upon air flow between a closed chamber and surrounding air produced by the combination of a pin hole opening and a capillary opening.

Still another object is to indicate vertical air speeds on a uniformly graduated dial by the aid of a pin hole restrictive member having a higher power characteristic.

A further object of the invention is to calibrate a pin hole restrictive opening in a vertical air speed indicator by the combination therewith of an adjustable capillary tube member.

Still a further object of the invention is to avoid zero-shift by the application of heat insulating covering to an auxiliary member of the indicator mechanism.

Yet a further object of the invention is to combine in one member of a vertical speed indicator device, a containing case, an air storage reservoir and a heat insulating layer.

An additional object of the invention is to adjust the zero reading of a vertical air speed indicator by the action of an auxiliary heat insulated frame member to compensate for heat leakage through the container case.

Still another additional object of the invention is to combine in one instrument a pin hole restrictive opening and a capillary tube restrictive opening.

Still another object of the invention is to calibrate the rate of air flow from a closed chamber through a pin hole opening, by adjustment of the dimensions of a capillary tube.

Still a further object of the invention is to combine in a single instrument structure an efficiently heat insulated reservoir, a composite restrictive opening within the reservoir, and a temperature responsive capsule and indicator.

Still an additional object of the invention is to combine in a single structure a thermos bottle type member for the heat insulated chamber and a restricted opening thereto with the restrictive members of the opening within the bottle and insulated thereby.

Yet another object of the invention is to heat insulate a restrictive opening for a vertical air speed meter.

Still another object of the invention is to limit the zero error of a vertical air speed indicator by the combination of a heat insulated reservoir and a composite restrictive opening.

Still another object of the invention is to incorporate within a single case a thermos bottle type insulated reservoir, a low error restrictive opening heat insulated thereby, an aneroid capsule and a dial, pointer and actuating mechanism.

Other objects and structural details will be apparent from the following descriptions when read in connection with the accompanying drawings, wherein:

Fig. 1 is a side view in section of the device of the invention;

Fig. 2 is a side view in section of the restricted opening of the invention;

Fig. 3 is an end view in section of the mechanism of the invention;

Fig. 4 is a front view of the scale of the instrument shown in Figs. 1, 2 and 3;

Fig. 5 is a side view partly in section of an alternative embodiment of the device of the invention;

Fig. 6 is a front view of the embodiment of Fig. 5 showing the higher order scale graduations, and Fig. 7 is a top view in section of an alternative embodiment of the device of the invention incorporating within a single case the restrictive opening member of the invention, an efficient heat insulating member for the simultaneous insulation of an air chamber and the restrictive opening and a capsule, pointer and indicating mechanism for the production of a complete unitary instrument.

Referring to the drawings, the device of the invention consists of a case member 1 having a sight glass 2, which, with the packing 3, forms a tight container, or chamber, or reservoir. A restricted opening member 4, as shown in detail in Fig. 2, is provided, attached to the rear of the case member 1, and projecting inwardly. Cooperating with the restricted opening member 4 there is provided a threaded insert member 5 which is adapted to receive a pipe coupling 6 for connection to the Pitot-static tube, if desired, to avoid pressure differences which may occur within the cockpit. The restricted opening member 5 is held in place by screws 7, which may conveniently be three or more in number.

The restricted opening member 4 consists of a support member 8, which is bored and recessed to receive a carrier member 9 to which a section of capillary tubing 11 is attached, projecting through the member 8 into the interior of the case member 1. A second carrier member 12 is provided to which is attached a second capillary member 14. These may conveniently be identical with the members 9 and 11, except insofar as adjustment in size are made for calibration purposes. Between the members 9 and 12 there are positioned one or more pin hole disc members 15, each having a capillary passage terminating in sharp-edged orifices. The disk members are equipped with packing and spacers as shown. The various members are held in place by a compression screw 16.

Within the case 1 there is also provided a support plate member 21 having a dial 22 and a pointer 23, the latter being carried upon a spindle 24 mounted in jewel bearings 25 and 26. A pinion 27 is also mounted upon the spindle 24. A pair of supporting arms 28 and 29 are also provided attached to the plate member 21 and joined at their outer ends by a cross bar 31. A capsule arm 32 is also provided attached at one end to the cross bar member 31 and held at the other end by an adjusting cam 33. Upon the capsule arm 32 there is mounted an aneroid capsule 34, the interior of which is connected through a tube 35 to the exterior atmosphere via the pipe member 6. Upon the aneroid capsule 34 there is mounted an attaching member 36 to which is coupled an actuating rod 37. A multiplier shaft 38 is also provided mounted in bearings 39 and 41 respectively supported in the plate 21 and on the arm 28. The multiplier shaft 38 has attached thereto a gear sector 42 which engages with the pinion 27 on the shaft 24. The multiplier shaft 38 also has thereon an arm member 43 cooperating with the pull rod 37. There is also provided a control spring 44 cooperating between the shaft 38 and the arm member 28.

The zero setting cam 33 is carried upon a shaft 46, and actuated by a gear 47 which engages with a pinion 48 upon the setting shaft 49.

There is also provided a correcting spring member 51 cooperating with the member 36 attached to the aneroid capsule 34. This spring is attached to the cross bar 31 by being clamped between a shoulder 52 and a clamp plate 53. The shoulder 52 has a projection 54 and the clamping plate 53 has a projection 55 within which are mounted calibrating screws 56.

The case member 1 may if desired be surrounded by a jacket or heat insulating covering to reduce heat transfer still further if desired, or a lining of heat insulating material may be inserted within the container 1. These are not shown in the drawings since they are not essential to the functioning of the device.

In the operation of this embodiment of the invention, the instrument as shown in the figures is mounted upon the instrument board of an aircraft. When the craft rises, the surrounding air shows a reduction in altitude-pressure as the craft rises and the rate of reduction in altitude-pressure is dependent upon the speed of the craft in a vertical direction. As long as the craft, and with it the instrument, are rising, air within the case 1 tends to flow outward because of the progressive reduction in exterior pressure, and accordingly air passes through the restricted opening member 4. Since, however, this restricted opening does not permit of free outflow of air, a pressure differential is built up within the chamber 1 surrounding the aneroid capsule 34. The interior of the capsule 34 is connected freely to the surrounding atmosphere and accordingly the pressure differential is applied between the interior of the capsule and the interior of the case 1. This pressure differential influences the capsule to cause it to move the pull rod 37, rotate the shaft 38 and thereby the shaft 24 and with it the pointer 23 to indicate the vertical speed of the craft.

During the vertical movement, air flows through the capillary 11, the pin holes 15 and the capillary 14 at a pre-determined rate as set by the calibration of the instrument, and as long as no change in temperature occurs, and only minor changes in altitude-pressure occur, the instrument does not require the services of compensating means to insure an accurate reading.

For the purpose of the above mentioned calibration the instrument may be positioned in a closed cabinet and the air pressure therein changed at a known rate, corresponding to the rate of change encountered during ascent or descent at a desired rate of speed, and the reading of the instrument observed. The instrument may, if desired, be compared directly with a correct reading instrument in the same enclosure. If, as is usually the case, the first reading is incorrect, the necessary changes are made in the dimensions of the restricted openings. If the reading is grossly in error, the pin hole openings may be replaced by others having larger or smaller openings according to whether the reading is too high or too low. If, as is usually the case, the reading departs by only a small amount from the correct value, the final adjustment may be made by suitable changes in the dimensions of the capillaries 11 and 14. It is desirable that initially the pin holes 15 and the capillaries 11 and 14 be of such size as to produce a reading slightly in excess of the correct value. The lengths of the capillaries may then be shortened by small amounts using any convenient method of removing metal from a convenient place until upon repeated checks the reading is found to be correct. Thus the calibration is obtained merely by the adjustment of the capillaries 11 and 14 in a fashion characteristic of prior vertical speed indicators, while utilizing the pin hole type of restrictive opening for the appropriate portion of the restrictive effect, thereby obtaining the low error characteristics of the combination of pin hole opening and capillary and the ease of calibration of the capillary opening.

It is found that by the use of Bakelite or molded composition case of substantial thickness the ordinary temperature changes around the instrument, especially if it is maintained in a heated cockpit, are sufficiently slow so that the rate of heat transfer through the case 1 is sufficiently small to produce such a low thermal expansion or contraction pressure within the case that negligible zero shift of the pointer occurs. This small zero shift may be still further reduced by heat insulation around or within case 1 and further reduction can be obtained by the use of double sight glasses 2 to provide a dead air space between.

As the aircraft rises, however, both the temperature and altitude pressure of the ambient atmosphere fall. With the ordinary vertical speed indicator having a capillary tubing as the restricted opening to the reservoir, the change in viscosity due to change in temperature and altitude-pressure introduce very serious errors into the reading of the instrument. In the instrument of the invention, however, no substantial errors occur, in view of the fact that the combination of pin hole restricted opening and capillary opening passes about the same volume of air regardless of temperature and altitude-pressure and accordingly substantially the same pressure differential for a given upward or downward speed is produced within the case member 1 without regard to the temperature or pressure of the air surrounding the instrument. This construction is sufficiently accurate to reduce the errors of reading to less than 6% between the ordinary extremes of airplane flight in temperature and altitude-pressure values.

Thus the instrument produces a differential pressure within the case which is a function of the rate of change of air pressure outside of the instrument, substantially without regard to the temperature, or to the altitude-pressure, at which the instrument is operating, and this pressure differential is measured and utilized to indicate the rate of vertical movement of the aircraft.

As previously pointed out, the rate of flow of air through a pin hole is a second order function of the driving pressure, and accordingly the instrument tends to indicate on a scale in which the unitary incremental divisions at the upper end of the scale are larger than those at the lower end of the scale. This tendency is modified by the fact that a portion of the restrictive member is made up of capillary tubing in which the restrictive effect varies directly with the driving pressure, and accordingly the combination of the two produces a restrictive effect and a scale character which does not follow strictly any particular mathematical law. This is particularly well shown in Fig. 6. Such a scale is acceptable for many commercial uses, especially where most of the readings will be made near the midpoint of the scale, at which point a convenient width of scale division occurs.

In order to obtain a linear scale of the character shown in Fig. 4, the compensating spring 51 and its associated members are brought into play. In the operation of this portion of the invention the spring 51 vibrates freely between the respective screws 56 at the early portion of travel of the capsule 34 and rod 37, and accordingly the only restriction upon the movement of the capsule 34 is that applied by the material of the capsule, and the spring 44, thereby permitting normal incremental movements according to the pressure differential. As the vertical speed increases, the pressure increases, and the movement of the capsule 34 increases. This gives a greater movement of the spring 51, causing the torque of the spring 51 to increase, since it is restricted in its large movement by one or more of the screws 56, thereby producing an increasing stiffness and a progressively greater narrowing of the width of the incremental unit divisions as higher and higher values are indicated. By this procedure a graduation character similar to that shown in Fig. 4 is readily obtainable, the divisions being substantially uniform within the accuracy of the meter reading over the entire scale.

The ordinary moulded composition case 1, as usually formed of Bakelite, is both air-tight and a sufficiently good heat insulator to limit the flow of heat therethrough to such a value that the zero-shift caused by heat flow to or from the air in the chamber is relatively small, and especially in planes having a heated cockpit, the zero-shift is negligible. The small residual zero-shift error may be still further reduced by the previously mentioned jacket of heat insulated material around the case and such other heat insulating procedures as the double sight glass.

For those instances where still better stability of the zero point is required, the vacuum jacket member previously mentioned may be inserted within the case and utilized as an insulating lining; and as a chamber per se. This structure is not shown in complete detail in Fig. 1 but it is obvious that by minor changes, a vacuum jacket member may be inserted within the case member 1 of Fig. 1 surrounding the frame members 28, 29 and 31 with a sealing ring or gasket interposed between the rim of the vacuum jacket and the main frame 21 in a manner analogous to that shown in Fig. 7. For this construction the restrictive opening member 4 may be attached to a convenient part of the frame mechanism such as the cross-bar member 31 and a tube led from the outlet end of the restrictive opening member 4 through the case plate 21 to the exterior air, or to the case space between the case walls 1 and the vacuum jacket member and thence through the coupling 6 directly to the exterior air or through the static connection of the Pitot-static tube. This construction is particularly advantageous because of the fact that it brings the axis of the vacuum jacket member and the axis of the case substantially into coincidence and produces an unusually compact, symmetrical and convenient instrument.

Alternatively, a substantially complete compensation for the zero-shift error may be obtained by the construction shown in Fig. 5. This alternative construction utilizes in large part the same members and same construction as in the embodiment of Fig. 1 with the exception that the cross-bar 31, which ties together the ends of the supporting arms 28 and 29, is heat insulated.

Thus, the plate 21 and arms 28 and 29 are utilized, as in the previous embodiment, but the upper ends of the arms 28 and 29 and the tie-bar 31 are removed and replaced by the structure shown in Fig. 5. This structure consists of a tie-rod 61, which is attached to the arms 28 and 29 by heat insulating couplings 62 and 63. These couplings are desirably made of material of good strength but low heat conducting capacity. A suitable material for these members is a molded composition such as Bakelite or hard rubber. The tie-rod 61 is desirably of the same material as the plate 21, and it is desirably covered with heat insulating material 64, which may be a wrapping of fabric tape or a wrapping of asbestos or other convenient heat insulating substances. In the operation of this embodiment of the device, the same closed chamber 1 is provided as before, with the same restricted opening member 4 for the passage of air as before described; together with a similar aneroid capsule, multiplying members, pointer and scale is indicated by corresponding reference numbers.

In the operation of this embodiment the same compensations for different temperatures and pressures are applied to the pointer indication by the compensating restricting member 4. However, the case 1 imposes only a limited resistance to heat flow or thermal leakage between the air within the case and the air outside of the case, permitting temperature equilibrium between the interior and the exterior to be approached at a given rate. This thermal leakage causes the pointer to tend to give a false indication or causes a zero-shift of the pointer as before described. However, in this embodiment the tie-rod 61 of the frame does not have the same temperature as the rest of the instrument, because of the heat insulation, and accordingly when the instrument is cooling down the tie-bar 61 cools more slowly than the plate 21 thereby holding the attached ends of the arms 28 and 29 farther apart than the base ends of the arms which are attached to the plate 21. Accordingly, a thermal contraction of the air within the case 1, which tends to produce a false pressure and a false reading of the pointer 23 is compensated by the shrinkage of the plate 21 in contrast to the lesser shrinkage of the tie-rod 61. This reaction has an effect analogous to the spreading apart of the arms 28 and 29 thereby operating the aneroid capsule 34 and the multiplying shaft 38. This separation moves the pointer by an amount which is readily adjusted to compensate for the movement of the pointer produced by the false pressure within the case, thereby correcting the zero-shift error.

For this purpose it is desirable that the rate of temperature change of the tie-bar 61 correspond to the cumulative effect of the heat leakage through the case 1 and the rate of flow of air caused by the false pressure resulting from the heat leakage. By this means the zero-shift error due to heat leakage through the walls of the reservoir is corrected by a relatively simple member. It may be observed that the embodiment of Fig. 5 is shown without the scale division modifying spring 51 and accordingly the embodiment of Fig. 5 requires a scale in general similar to that of Fig. 6.

Either of the above described embodiments will provide a satisfactory stability of zero point setting when maximum accuracy is not required or where only relatively small temperature changes are encountered as in a heated cockpit plane.

For maximum stability of zero point setting in adverse conditions of temperature change such as in an open cockpit plane for high altitude flying at high speeds, it is desirable that the maximum accuracy of zero position be obtained and for this purpose the embodiment of Fig. 7 may be utilized. Broadly, this embodiment consists of a single case structure, the forward portion of which contains the aneroid capsule, the dial, the pointer, the operating mechanism and correcting mechanism closely similar to, or if desired substantially identical with the structure shown in Fig. 1.

Reference characters are applied to Fig. 7 corresponding to those applied to Fig. 1 and the same structures are indicated in both drawings by similar reference characters. The case member of the embodiment of Fig. 7 is not, however, the same in all respects as the case in Fig. 1. The case 71 (Fig. 7) is provided with an open bottom rather than a closed integral bottom as shown in Fig. 1, and it may be equipped with ears 72 as shown. The closure member or partition 73 may be provided and an additional portion 74 having ear members 75 attached to the case portion 71 and ears 72 by bolts 76. This is a structure which is convenient for assembly, but the case 71—74 may be made in a single unitary member analogous to the case member 71 of Fig. 1 except for the greater depth, if so desired.

Within the case member there is provided a vacuum jacketed member or thermos bottle type of reservoir 77 which may be seated against a sealing gasket 78, carried on the partition 73, by the pressure produced by the spring 79.

The restrictive opening member 4 may be mounted upon the partition 73, and in any event is adapted to be extended rearwardly into and within the chamber formed by the vacuum jacket member 77. The restrictive opening member 4 is conveniently held in place by bolts 81. Connection is made from the chamber within the vacuum jacket member 77 to the capsule 34 by the duct or tube 82 which may be passed through the mounting flange of the restrictive opening member 4 as shown, or may be passed directly through the partition member 73.

It is to be noted particularly that in the embodiments of Fig. 1 and Fig. 5, the interior of the case serves simultaneously as reservoir, and as housing for the operating mechanism and that the interior of the capsule 34 is connected directly to the exterior atmosphere. In the embodiment of Fig. 7, however, the interior of the case portion 71 is connected directly to the surrounding atmosphere through the duct or tube 83 and the interior of the capsule 34 is connected to the chamber or reservoir. This obviously results in a reversal of the movement of the capsule 34 in the event of an upward or downward movement, but this reversal in direction of movement is compensated by the reversal in the position of the lever 43 as shown in Fig. 7.

The method of operation of the device of Fig. 7 is generally closely similar to the method of operation of the device of Figs. 1 and 6 except for the application of higher grade and more efficient heat insulation to the air chamber or reservoir; and except for the reversal in direction of movement of the capsule in either given upward or downward movement.

The embodiment of Fig. 7 utilizes a partition member 73 between the portion of the case which houses the vacuum jacket member and the portion of the case which houses the pressure sensitive member and the indicating members. Such a partition is, however, not necessary but instead the case members 71 and 74 may be made in a single integral cylinder and the stopper for the vacuum jacket member 77 may be attached to the cross-bar 31 or to other convenient parts of the frame upon which the pressure sensitive and indicating members are mounted. This construction is particularly advantageous because of the fact that it permits the entire functioning mechanism to be assembled as a unit in operative condition and thereafter permits this completely assembled (and if desired, calibrated) mechanism, to be inserted within the case, and for that reason is particularly advantageous.

This construction also provides a device in which the axis of the cylindrical vacuum jacket member 77 is substantially coincident with the axis of the case thereby providing an instrument in which the weight distribution is symmetrical.

The embodiment of Fig. 7 provides a stout case for the protection of the vacuum jacket member 77 which is particularly desirable if the jacket member is formed of glass. A preferable jacket member is, however, made of metal such as thin steel with the interspace evacuated. Such a member is much more rugged than a glass structure, and in some instances the case portion 74 may be omitted and the metal vacuum jacket member 77 may be held in place by such simple expedients as straps or a friction fit against a cork stopper in view of the fact that the pressure differentials are always low. This effects a saving in weight which in some instances is important.

Thus the device of the invention comprises a combination including a chamber or reservoir, means for measuring and indicating pressure differentials between the interior and exterior of the reservoir, and a restrictive opening between the reservoir and the surrounding air which permits the passage of a substantially constant volume of air per unit difference in pressure without regard to the temperature or pressure at which the device is operating, together with means for the convenient calibration of the restrictive opening; and also means for modifying the character of the scale, and means for reducing the effect of heat leakage between the reservoir and the ambient atmosphere.

The invention further includes the combination in a single case of a highly efficient heat insulating member for the air chamber and the inclusion within the insulated air chamber of the restricted opening in such a position that it partakes of the same temperature as the air within the chamber.

While there are above disclosed but a limited number of embodiments of the device of the invention, it is possible to produce still other embodiments thereof without departing from the inventive concept herein disclosed and it is therefore desired that only such limitations be imposed upon the appended claims as are stated therein or required by the prior art.

What I claim and desire to secure by United States Letters Patent is:

1. A vertical speed indicator instrument comprising in combination a reservoir member, a pressure responsive means positioned therein and connected to the exterior atmosphere, a pressure indicating means associated with said responsive means comprising a scale and pointer means graduated according to the rate of vertical travel, and a restricted opening member cooperating between the interior and exterior of said chamber comprising a pin hole member having a pin hole therein and an adjustable capillary tube member arranged so that the pin hole and capillary tube are in series and so adjusted that temperature and pressure errors of the pin hole and tube are compensated to provide substantially accurate vertical speed indication at all altitudes within the range of the instrument.

2. A vertical air speed indicator instrument comprising in combination a heat-insulating-composition case, a glass sight member attached thereto, air tight packing therebetween, a restricted opening means permitting limited entrance and exit of air from said case, and comprising capillary tube and pin hole members, each of said pin hole members having an orifice therein with sharp edges, a frame within said case, a dial adjacent said glass, a pointer and spindle cooperating therewith, a multiplying member comprising a pinion on said pointer shaft, a gear sector cooperating therewith, a multiplier shaft, a control spring, and a lever member; an aneroid capsule, a support arm therefor, a link to said multiplier lever and an air passage connection from said capsule to the exterior of said case, and scale correcting means comprising a spring cooperating with said link, and stop screws for the adjustment of the torque of said spring, said capillary tube being arranged in series with said orifices and adjusted as to length so that temperature and pressure errors of the orifices and tube are compensated to provide substantially accurate vertical speed indication at all altitudes within the range of the instrument.

3. A vertical air speed indicator comprising in combination a heat-insulating-composition case, a glass sight member attached thereto, air-tight packing therebetween, a restricted opening means permitting limited entrance and exit of air to and from said case, and comprising capillary tube and pin hole members each having a sharp-edged pin hole orifice arranged in series with capillary tube, a frame within said case, a dial adjacent said glass, a pointer and spindle cooperating therewith, a multiplying member comprising a pinion on said pointer shaft, a gear sector cooperating therewith, a multiplier shaft, a control spring, and a lever member, an aneroid capsule, a support arm therefor, a link between said capsule and said multiplier lever, an air passage connection from said capsule to the exterior of said case, and a heat insulated tie-rod cooperating with said support arm.

4. A vertical air speed indicator comprising a case member, a pressure sensitive and pressure indicating mechanism therein, a vacuum jacket member also within said case, and means co-operating between said case and said chamber for the closure thereof, said closure means comprising a composite restrictive opening device made up of pin hole members and capillary tube members.

5. In a vertical speed responsive instrument the combination with a chamber enclosing a volume of air; and a differential pressure responsive member connected to respond to a difference in pressure between said chamber and the atmospheric air; of a constricted passage between said chamber and the atmosphere, said passage including a capillary portion and a sharp-edged orifice portion in tandem and adjusted, whereby each portion, having a temperature and altitude-pressure error of a sign opposite to that of the other, tends to compensate the error of the other portion.

6. In a vertical speed responsive instrument the combination with a chamber enclosing a volume of air; and a differential pressure responsive member connected to respond to a difference in pressure between said chamber and the atmospheric air; of a passage between said chamber and the atmosphere, said passage including at least one flow constricting member having both a capillary portion and a sharp-edged orifice portion, said capillary and orifice being arranged in series and adjusted in a manner whereby each portion, having a temperature and altitude-pressure error of a sign opposite to that of the other, tends to compensate the error of the other portion.

7. In a vertical speed responsive instrument the combination with a chamber enclosing a volume of air; and a differential pressure responsive member connected to respond to a difference in pressure between said chamber and the atmospheric air; of a passage between said chamber and the atmosphere, said passage including a non-adjustable flow constricting member having both a narrow capillary portion and a sharp-edged orifice portion, each portion having a temperature and density error of a sign opposite to that of the other portion, and a capillary tube capable of adjustment, said capillary tube having a larger cross sectional aperture than the capillary portion of said member.

8. In a vertical speed responsive instrument the combination with a chamber enclosing a volume of air; and a differential pressure responsive member connected to respond to a difference in pressure between said chamber and the atmospheric air; of a passage between said chamber and the atmosphere, said passage including two capillary portions and at least one pin hole member intermediate said capillary portions, said capillaries being adjusted whereby temperature and pressure errors of the respective capillaries and pin hole member are compensated to provide substantially accurate vertical speed indication at all altitudes within the range of said instrument.

9. In a vertical speed responsive instrument the combination with a chamber enclosing a volume of air; and a differential pressure responsive member connected to respond to a difference in pressure between said chamber and the atmospheric air; of a passage between said chamber and the atmosphere, said passage including two capillary tube portions and two pin hole orifices intermediate said capillary tube portions, said capillary portions being adjusted whereby the errors of one sign due to the orifices and the errors of the opposite sign due to the capillaries are compensated.

10. In a vertical speed responsive instrument the combination with a chamber enclosing a volume of air; and a differential pressure responsive member connected to respond to a difference in pressure between said chamber and the atmospheric air; of a passage between said chamber and the atmosphere, said passage including a tandem arrangement a sharp-edged orifice and a capillary passage adjustable as to length, whereby the orifice and the capillary, each having a temperature and altitude pressure error of a sign opposite to that of the other, tend to compensate the error of the other, the total resistance of the passage being adjustable at the capillary.

11. A vertical speed indicator comprising, in combination, a chamber enclosing a volume of air; a differential pressure responsive member connected to respond to a difference in pressure between said chamber and the atmospheric air, said passage including a capillary portion having an altitude-pressure error of one sign and a sharp-edged orifice portion having an altitude-pressure error of opposite sign; indicating means connected to be actuated by said pressure responsive means; and an element responsive to the rate of change in temperature of said volume of air, said element being connected to increase and decrease the reading of said indicating means in response to the rate of change in temperature of said volume of air, said capillary and sharp edge orifice portion being arranged in series so that the altitude-pressure error of opposite sign compensate each other.

PAUL KOLLSMAN.